United States Patent
Murphy

Patent Number: 5,806,233
Date of Patent: Sep. 15, 1998

[54] LOST-MOTION FISHING LURE

[76] Inventor: John J. Murphy, 705 West Pine St., Lancaster, Wis. 53813

[21] Appl. No.: 748,058
[22] Filed: Nov. 13, 1996
[51] Int. Cl.⁶ .......................... A01K 85/00; A01K 83/02
[52] U.S. Cl. .............................. 43/42.04; 43/37
[58] Field of Search ................... 43/15, 34, 35, 43/37, 42.04, 42.05, 42.24, 42.37, 42.38, 42.44

[56] References Cited

U.S. PATENT DOCUMENTS

| | | | |
|---|---|---|---|
| 813,718 | 2/1906 | Knowles | 43/42.04 |
| 1,200,135 | 10/1916 | Reynolds | 43/42.04 |
| 1,682,711 | 8/1928 | Pflueger | 43/42.04 |
| 2,172,889 | 9/1939 | Niemi | 43/42.04 |
| 2,190,440 | 2/1940 | Goldammer | 43/42.04 |
| 2,246,757 | 6/1941 | Rosegard | 43/42.04 |
| 2,275,869 | 3/1942 | Seaton | 43/42.04 |
| 2,547,279 | 4/1951 | Patterson | 43/42.04 |
| 2,796,692 | 6/1957 | Harley | 43/42.04 |

Primary Examiner—Jack W. Lavinder
Attorney, Agent, or Firm—Bernard J. Murphy

[57] ABSTRACT

The body of a fishing lure has a rod extending therefrom to which is tethered, by fishing line, a fishing hook. The body has an elastomeric band thereabout, and the shank of the hook and the rod-to-hook fishing line are stowed within the band in a set up, ready to snare a fish. With a fish strike at the hook, the hook and line withdraw from the band, rearwardly of the lure body, while the lure body is trolled or reeled forwardly. In turn, the hook reaches the end of its line-tether, and comes to a sudden halt, whereby the fish is deeply hooked.

4 Claims, 1 Drawing Sheet

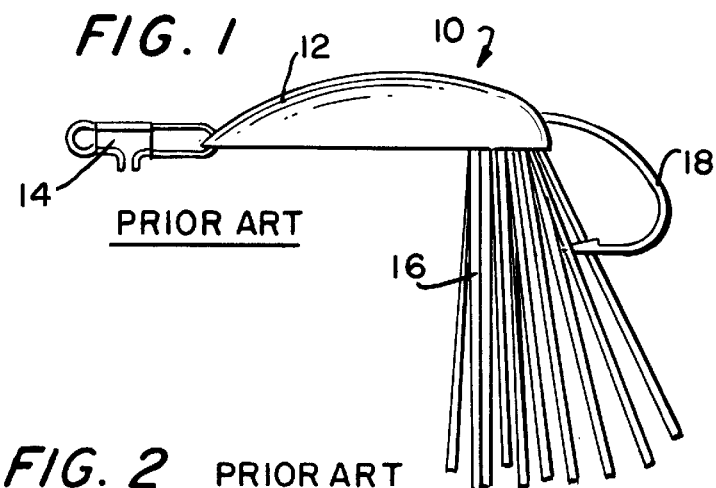
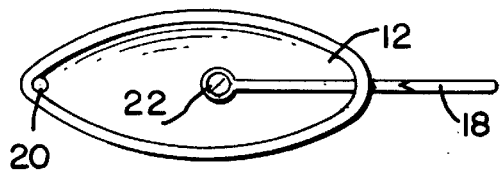
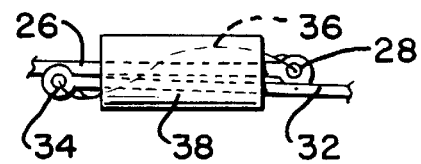
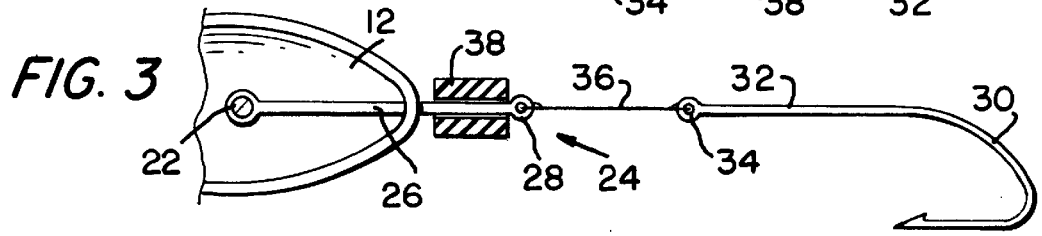
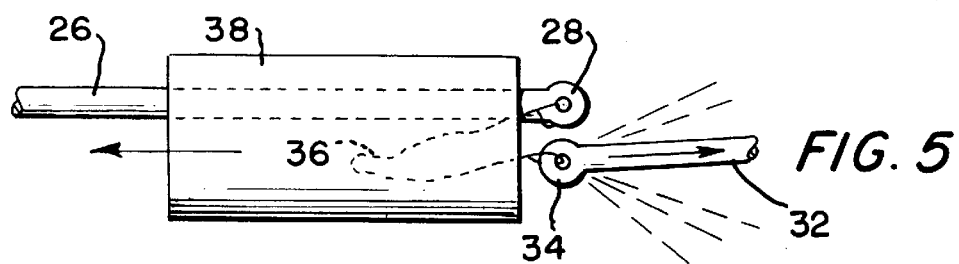
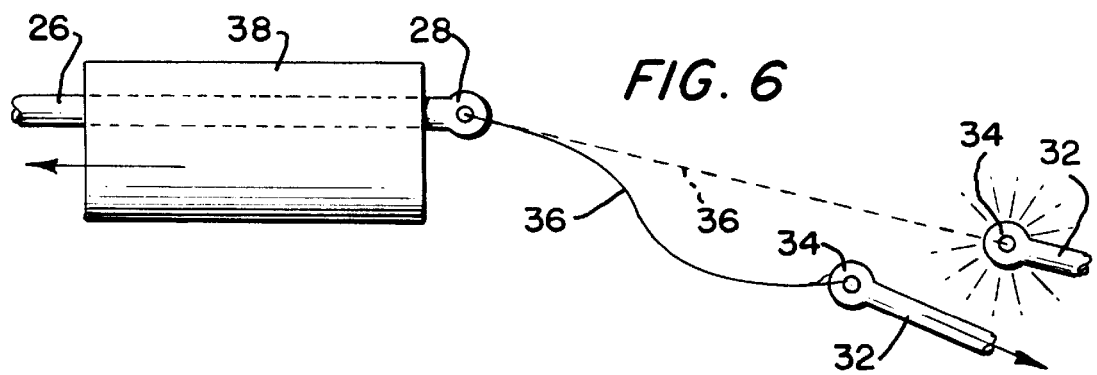

LOST-MOTION FISHING LURE

This invention pertains to fishing lures, and in particular to an improved fishing lure in which, upon a hook of the lure having a fish strike, the body of the lure and the hook exhibit a relative lost motion therebetween.

Typically, lost motion is defined as the difference between the motion of a driver and that of a follower, due to yielding or looseness. It is particularly this very principle which is employed in the instant invention, as well as a universal tethering of the hook, which provides the improved fishing lure.

It is known, in the prior art, especially from U.S. Pat. Nos. 2,225,676, issued to E. E. White, for a Fishing Lure, on 24 Dec., 1940; 2,528,861, issued on Nov. 7th, 1950, to A. C. Clasen et al, for a Fishing Lure; and 5,090,151, for a Fishing Lure with Releasable Hook, granted to G. Salminen, on Feb. 25th, 1992, to define a fishing lure in which the body of the lure and the hook separate, leaving the hook universally tethered, and distant from the lure body, the better to insure that the fish is securely hooked. However, the prior art lures do not disclose or suggest the use of a lost motion effect, upon disengagement of the hook from the body of the lure.

The U.S. Pat. No. 2,588,400, of 11 Mar. 1952, issued to C. G. McRoberts, for an Artificial Bait, is an exemplary example of a lure which does employ a sort of lost motion. In this reference, the lure has a hook which is held in a given disposition by a spring strip or retainer plate and, upon a fish striking at the hook, the latter slides rearwardly along the lure body to a stop. However the hook remains coupled to the spoon of the lure, limiting the relative movement of the hook on the spoon. Fish "work" hooks, of lures, using the body of the lure, i.e., the spoon, or the like, to free itself therefrom; they "work" a leverage, using the physical rigidity of the lure body and its movement-limited hook, to disengage from the hook. This is the limitation found to obtain in lures of the type set forth by patentee McRoberts. As for the universally tethered hooks cited in the foregoing, they simply separate from the lure bodies with no lost motion effect.

What has been sorely needed in this technology is a lure which offers both a universality of tethering of the hook with a lost-motion effect which improves the snaring of the fish on the hook.

It is an object of this invention to set forth a fishing lure which meets the aforesaid need. Particularly it is an object of this invention to disclose a lost-motion fishing lure comprising a lure body; a fishing hook; first means, fastened to said body, for coupling thereto a fishing hook; second means, attached to, and interposed between, said hook and said first means, for universally tethering said hook to said first means; and third means, engaging said first means, (a) for holding said fishing hook and said tethering means in a juxtapositioning with said first means, and (b) for permitting, in response to a fish strike on said hook, a progressive release of said hook and said tethering means, respectively, from juxtapositioning with said first means; wherein said tethering means, in response to a progressive release of said hook and said tethering means from juxtapositioning with said first means, comprises means for effecting an unguided and increasing lost-motion displacement between said hook and said first means.

Further objects of this invention, as well as the novel features thereof, will become apparent by reference to the following description, taken in conjunction with the accompanying figures, in which:

FIG. 1 is a side elevational view of a prior art fishing lure;

FIG. 2 is an underside view of the lure of FIG. 1 in which, however, the coupling clip and the simulated grass are omitted;

FIG. 3 is a view of a body of a lure, of fragmentary depiction, which cooperatively carries the tethering of a hook to a lure-body limb, and an elastomeric band about the limb, according to an embodiment of the invention;

FIG. 4 shows only the tethering line, the lure-body limb, the shank of the hook and the elastomeric band, ready for a fish strike, and somewhat enlarged over the scale of FIG. 3;

FIG. 5 corresponds generally to FIG. 4, albeit in much greater scale, depicting the time when the hook has exited the band, and the tethering line is to follow; and FIG. 6, similar to FIG. 5, shows the tethering line substantially fully payed out, in full line depiction, and at a length-limit in dashed line illustration.

The prior art lure 10, shown in FIG. 1, comprises a sort of shell 12 with a coupling clip 14 fixed thereto at a leading end of the shell 12, simulated grass 16 depending from the shell or body 12, and a hook 18 projecting from the rear of the shell or body 12. FIG. 2, an underside view, shows the clip-receiving aperture 20 and the hook 18 in penetration of a trailing portion of the shell or body 18, and secured by hardware 22.

An embodiment 24 of the invention is shown in FIG. 3; it comprises a body 12 having a limb 26 fixed thereto, in lieu of a hook, by hardware 22, and the outwardly-extending end of the limb 26 has eye 28 formed thereon. The limb 26, then, replaces the hook, but the same as the hook, it penetrates a rear portion of the body 12. A hook 30, having a shank 32, with an eye 34 formed thereon, is universally tethered to the limb 26; a length of fishing line 36 is fastened at opposite ends thereof to the eyes 28 and 34. In addition, an elastomeric band 38 is clasped about the outermost portion of the limb 26, and up against the eye 28.

To set up the invention 24, ready to snare a fish, the eye 34 and shank 32 of the hook 30, are pushed into the band 38 until the eye 34 exits the body—adjacent portion of the band 38, as shown in FIG. 4. With this set up, the shank 32 of the hook 30, and the tethering line 36, are held by the band 38. Band 38, as FIG. 4 depicts, confiningly surrounds the shank 32 and the tethering, fishing line 36, and for being elastomeric, the band 38 releasably holds the shank 32 and the line 36 therewithin, in juxtapositioning with the limb 26, until extracted from the band 38 by a fish strike on the hook 30. Upon a fish making a strike on the hook 30, with the body 12 being trolled or reeled in a given direction, the hook 30, of course, moves out from the band 38 and proceeds in the opposite direction. This is shown in FIG. 5 where the hook 30 has just released from the band 38, to travel with the fish in the direction shown by arrow on the shank 32 of the hook 30, where the band 38 travels in the direction of the in-reeling or trolling as represented by the arrow originating at the band 38. This is the lost-motion effect, as the body 12, limb 26, and band 38 constitute the driver, and the hook 30 is the follower; as can be appreciated, the body-limb-band driver, and the hook follower demonstrate differences in motion, due to the delayed release of the hook 30 from the band 38.

As soon as the hook 30 has removed from the band 38, as shown in FIG. 5, it has universal movement, such being represented by the plurality of lines adjacent the shank 32. FIG. 6 shows the band 38 and the limb 26 proceeding leftwardly, and the hook 30 rightwardly, in the same lost motion action, until the line 36 has been fully payed out from the band 38. With the line 36 reaching its full pay out, the hook comes to a sudden halt and, with this the hook embeds, deeply, into the fish.

Now, in contrast to the concept set out in the U.S. Pat. No. 2,588,400, the line 36 gives the hook its universal movement, and remotely from the body 12 of the lure. Accordingly, the fish cannot effect any leverage, against the body, in an effort to free itself from the hook 30. Too, in contrast to the U.S. Pat. Nos. 2,225,676; 2,528,861; and 5,090,151, the present invention provides the lost motion, between the hook 30 and the body 12 of the lure, with the limit-stop, shock ending of the pay out of the line 36.

Lures designed for sport fishing, of course, are crafted with care to simulate bait which will be tempting to the fish which is intended to be caught. To that end, then, it is desirable to have any ancillary structures hidden in the body of the lure, or mounted remote from the body of the lure, so that the configuration of the lure body is not significantly altered and will retain its attraction for the fish. Consequently, the instant invention purposely employs a rearwardly extending end of the limb 26 for the clasp of the elastomeric band 38 and the hook tethering line 36. In this, the designed configuration of the lure body 12 is not changed in any way. It is only after a fish strikes at the lure body 12, that the hook 30 comes free of the band 38, and trails behind the body, with the fish hooked to the freely tethered hook 30. The invention does not disfigure or change the bait-simulating configuration of the lure body 12.

While I have disclosed my invention in connection with a specific embodiment thereof, it is to be clearly understood that this is done, only by way of example, and not as a limitation to the scope of the invention, as set out in the objects thereof, and in the appended claims.

I claim:

1. A lost-motion fishing lure, comprising:

a lure body having a leading end and a trailing end;

a fish hook having a shank, at one end thereof;

a limb, having a first end thereof coupled to said body, and having a second end projecting rearwardly of said trailing end of said body;

first means (a) remote from said body, and (b) rearward of said trailing end, for tethering said shank to said second end of said limb; and second means, coupled to said limb, also (a) remote from said body and (b) rearward of said trailing end, for confiningly surrounding and releasably holding, within said second means and in juxtaposition with said second end of said limb, both said shank and said tethering means.

2. A lost-motion fishing lure, according to claim 1, wherein:

said second means comprises an elastomeric band clasping said second end of said limb.

3. A lost-motion fishing lure, according to claim 1, wherein:

said tethering means comprises a length of fishing line intercoupling said shank and said second end of said limb.

4. A lost-motion fishing lure, according to claim 3, wherein:

said second end of said limb has an eye formed thereon;

said shank has an eye formed on an end thereof; and said length of fishing line is fastened, at opposite ends thereof, to both said eyes.

* * * * *